United States Patent
Huang et al.

(10) Patent No.: US 10,411,618 B2
(45) Date of Patent: Sep. 10, 2019

(54) AIR CONDITIONER, AND METHOD AND DEVICE FOR CONTROLLING ITS COMPRESSOR TO STOP

(71) Applicant: GD MIDEA AIR-CONDITIONING EQUIPMENT CO., LTD., Foshan (CN)

(72) Inventors: Zhaobin Huang, Foshan (CN); Guozhu Zhang, Foshan (CN); Lianghong Zhu, Foshan (CN)

(73) Assignee: GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 0 days.

(21) Appl. No.: 15/541,292

(22) PCT Filed: Jun. 27, 2016

(86) PCT No.: PCT/CN2016/087318
§ 371 (c)(1),
(2) Date: Jun. 30, 2017

(87) PCT Pub. No.: WO2017/152546
PCT Pub. Date: Sep. 14, 2017

(65) Prior Publication Data
US 2019/0006965 A1 Jan. 3, 2019

(30) Foreign Application Priority Data
Mar. 9, 2016 (CN) ............ 2016 1 0134309
Apr. 27, 2016 (CN) ............ 2016 1 0273557

(51) Int. Cl.
*H02P 3/22* (2006.01)
*H02H 7/08* (2006.01)
(Continued)

(52) U.S. Cl.
CPC ............ *H02P 3/22* (2013.01); *F04D 25/0693* (2013.01); *F04D 27/00* (2013.01); *H02H 7/08* (2013.01); *H02P 27/08* (2013.01)

(58) Field of Classification Search
CPC .......................................... H02P 3/22
(Continued)

(56) References Cited

U.S. PATENT DOCUMENTS 5,782,610 A * 7/1998 Ikeda ............... F04C 18/0215
318/379
5,808,441 A * 9/1998 Nehring ............... H02H 7/08
318/751
6,646,411 B2 * 11/2003 Hirono ............... H02P 3/18
318/757

FOREIGN PATENT DOCUMENTS

CN 2468212 Y 12/2001
CN 1433137 A 7/2003
(Continued)

OTHER PUBLICATIONS

PCT/CN2016/087318 International Search Report & Written Opinion dated Dec. 13, 2016, 13 pages.
(Continued)

*Primary Examiner* — David Luo
(74) *Attorney, Agent, or Firm* — Anova Law Group, PLLC (57) ABSTRACT

An air conditioner, a method and a device for controlling a compressor in the same are disclosed in the present disclosure. The method includes: during a shutdown process of the air conditioner, controlling a drive circuit of the compressor to short three phase windings of the compressor if receiving a stop signal for stopping the compressor; and controlling a rotor of the compressor to stop according to a brake torque generated by shorting the three phase windings, to stop the compressor. The method shorts the three phase windings by (Continued)

controlling the drive circuit, thus to generate the brake torque to control the rotor to stop faster. As a result, the method enables the compressor to stop and to stay still rapidly, thereby facilitating to reduce a piping stress in the air conditioner and to prolong a working life of a pipe in the air conditioner.

18 Claims, 7 Drawing Sheets

(51) Int. Cl.
   *F04D 25/06* (2006.01)
   *F04D 27/00* (2006.01)
   *H02P 27/08* (2006.01)

(58) Field of Classification Search
   USPC .................................................. 318/599, 560
   See application file for complete search history.

(56) References Cited

FOREIGN PATENT DOCUMENTS

| | | | |
|---|---|---|---|
| CN | 1799191 | A | 7/2006 |
| CN | 101154905 | A | 4/2008 |
| CN | 101469697 | A | 7/2009 |
| CN | 101610056 | A | 12/2009 |
| CN | 101682285 | A | 3/2010 |
| CN | 102072551 | A | 5/2011 |
| CN | 102332838 | A | 1/2012 |
| CN | 103427735 | A | 12/2013 |
| CN | 103618483 | A | 3/2014 |
| CN | 103968495 | A | 8/2014 |
| CN | 104145418 | A | 11/2014 |
| CN | 105656370 | A | 6/2016 |
| CN | 105958871 | A | 9/2016 |
| JP | H1175386 | A | 3/1999 |
| JP | 2007037382 | A | 2/2007 |
| JP | 2009284747 | A | 12/2009 |

OTHER PUBLICATIONS

PCT/CN2016/087318 English translation of International Search Report dated Dec. 13, 2016, 2 pages.
Chinese Patent Application No. 201610273557.1, First Office Action dated Dec. 4, 2017, 9 pages.
Chinese Patent Application No. 201610273557.1, English translation of First Office Action dated Dec. 4, 2017, 10 pages.
Chinese Patent Application No. 201610273557.1, Office Action dated Jul. 13, 2018, 10 pages.
Chinese Patent Application No. 201610273557.1, English translation of Office Action dated Jul. 13, 2018, 13 pages.
Canadian Patent Application No. 2977332 Office Action dated Apr. 26, 2018, 6 pages.
The State Intellectual Property Office of People's Republic of China The Third Chinese Office Action for Chinese Application No. 201610273557.1 dated Jan. 11, 2019 23 Pages (including English translation).

* cited by examiner

AIR CONDITIONER, AND METHOD AND DEVICE FOR CONTROLLING ITS COMPRESSOR TO STOP

CROSS-REFERENCE TO RELATED APPLICATION

This application is a U.S. national phase application based on International Application No. PCT/CN2016/087318, which claims priority to and benefits of Chinese Patent Application Serial Nos. 201610273557.1 filed with the State Intellectual Property Office of P.R. China on Apr. 27, 2016, and 201610134309.9 filed with the State Intellectual Property Office of P. R. China on Mar. 9, 2016, the entire contents of which are incorporated herein by reference.

FIELD

The present disclosure relates to the field of air conditioner technology, and more particularly to a method for controlling a compressor in an air conditioner to stop, a device for controlling a compressor in an air conditioner to stop and an air conditioner.

BACKGROUND

Since it is impossible to measure a rotation speed of a rotor of a compressor in an inverter air conditioner directly, a method without speed measurement is applied to control the compressor. However, this method fails to achieve a closed-loop control at a low speed. Therefore, a shutdown process of the inverter air conditioner is realized generally by stopping the compressor directly or by reducing a frequency to a low frequency to directly stop the compressor, which is unable to reduce the frequency to zero.

For example, during the shutdown process of the air conditioner, after a stop signal for stopping the compressor is received, a drive signal for controlling the compressor is stopped outputting and a current of the compressor becomes to zero immediately. Under an action of a refrigerant pressure in a pipe, the compressor is stopped freely. However, due to the action of the refrigerant pressure, the compressor may be stopped in a manner of oscillation attenuation, thereby resulting in a piping vibration and affecting a piping stress.

SUMMARY

Embodiments of the present disclosure provide a method for controlling a compressor in an air conditioner to stop. The method includes: during a shutdown process of the air conditioner, controlling a drive circuit of the compressor to short three phase windings of the compressor if receiving a stop signal for stopping the compressor; and controlling a rotor of the compressor to stop according to a brake torque generated by shorting the three phase windings, to stop the compressor.

Embodiments of the present disclosure provide a device for controlling a compressor in an air conditioner to stop. The device includes: a drive circuit, having a first output terminal, a second output terminal and a third output terminal, in which the first output terminal, the second output terminal and the third output terminal are correspondingly connected with three phase windings of the compressor respectively; and a controller, configured to control the drive circuit to short the three phase windings when receiving a stop signal for stopping the compressor and to control a rotor of the compressor to stop according to a brake torque generated by shoring the three phase windings, to stop the compressor.

Embodiments of the present disclosure further provide an air conditioner. The air conditioner includes the device described above for controlling a compressor to stop.

DETAILED DESCRIPTION

Descriptions will be made in detail to embodiments of the present disclosure, examples of which are illustrated in drawings, in which the same or similar elements and the elements having same or similar functions are denoted by like reference numerals throughout the descriptions. The embodiments described herein with reference to drawings are explanatory, are intended to understand the present disclosure, and are not construed to limit the present disclosure.

The method for controlling a compressor in an air conditioner to stop, a device for controlling a compressor in an air conditioner to stop and an air conditioner provided in embodiments of the present disclosure will be described referring to the drawings.

Figure 1:
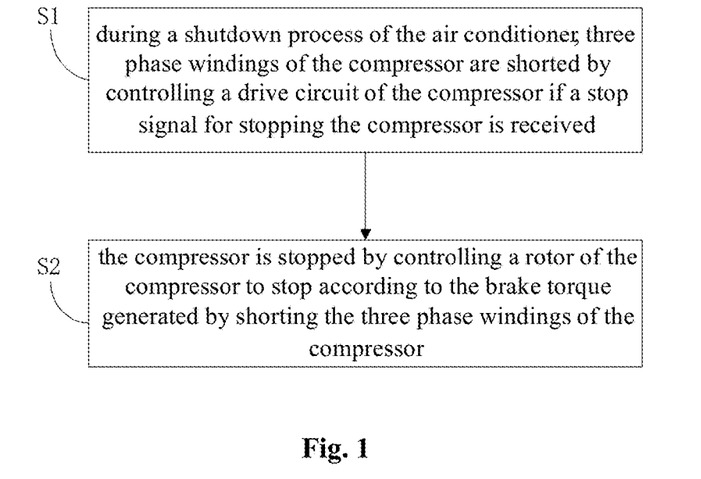
FIG. 1 is a flow chart illustrating a method for controlling a compressor in an air conditioner to stop according to embodiments of the present disclosure.

FIG. 1 is a flow chart illustrating a method for controlling a compressor in an air conditioner to stop according to embodiments of the present disclosure. As illustrated in FIG. 1, the method includes followings.

At block S1, during a shutdown process of the air conditioner, three phase windings of the compressor are shorted by controlling a drive circuit of the compressor if a stop signal for stopping the compressor is received.

Figure 2:
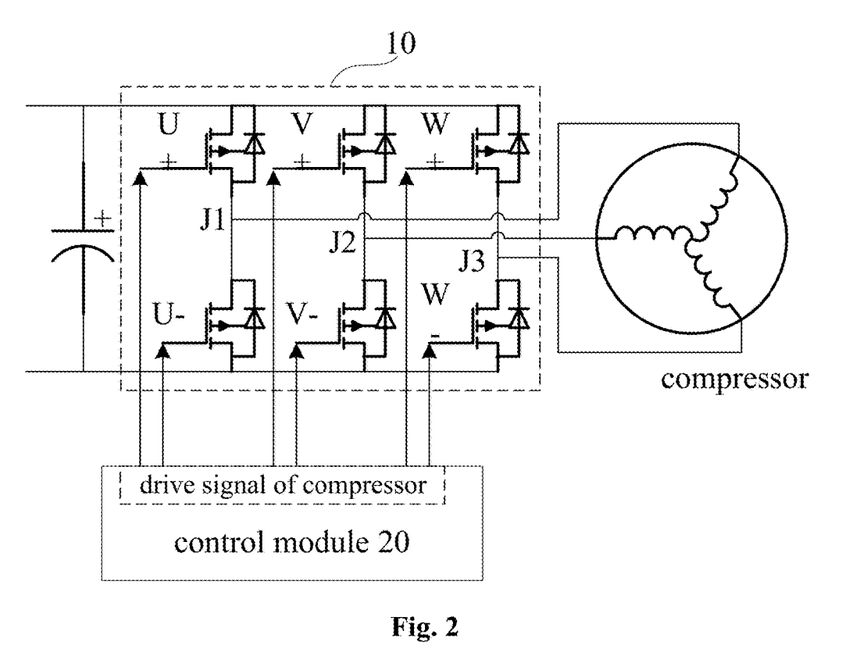
FIG. 2 is a topology diagram of a control circuit of a compressor in an air conditioner according to an embodiment of the present disclosure.

According to an embodiment of the present disclosure, as illustrated in FIG. 2, the drive circuit 10 of the compressor includes six power switch tubes (also referred to as "power switches"). The six power switch tubes constitute three phase bridge legs. The first bridge leg of the three phase bridge legs has a first node J1, a second bridge leg of the three phase bridge legs has a second node J2, and a third bridge leg of the three phase bridge legs has a third node J3. The first node J1, the second node J2 and the third node J3 are correspondingly connected with the three phase windings respectively of the compressor. The six power switch tubes may be ICBTs (Insulated Gate Bipolar Transistor) or MOSFETs (Metal Oxide Semiconductor Field Effect Transistor). Each power switch tube is antiparallel with a diode. It may be understood that, in embodiments of the present disclosure, an IPM (Intelligent Power Module) may be directly employed as the drive circuit of the compressor.

As illustrated in FIG. 2, when the compressor is running, a controller 20 outputs a drive signal of the compressor to the drive circuit 10 of the compressor, to control the six switch tubes in the drive circuit 10 to switch on and off, thus the compressor is controlled. If the stop signal for stopping the compressor is received, the controller 20 shorts the three phase windings of the compressor by controlling the drive circuit 10 of the compressor. And then a brake torque is generated to control the compressor to stop and to stay still rapidly.

At block S2, the compressor is stopped by controlling a rotor of the compressor to stop according to the brake torque generated by shorting the three phase windings of the compressor.

Specifically, in embodiments of the present disclosure, a motor in the compressor may be a permanent magnet synchronous motor or a permanent magnet brushless DC motor. Due to an action of a permanent magnet in the permanent magnet synchronous motor or in the permanent magnet brushless DC motor, a back electromotive force is generated as the rotor rotates if the three phase windings are shorted. A phase current (a brake current) is generated from the back electromotive force under actions of a resistance and an inductance of the rotor. And a counter brake torque is generated from the phase current to control the rotor of the compressor to stop. Therefore, the brake torque is generated by shoring the three phase windings if a rotation speed of the rotor reaches a certain initial velocity. Then, the rotor is stopped faster, thus enabling the compressor to stop and stay still rapidly.

In other words, in embodiments of the present disclosure, after the stop signal for stopping the compressor is received, it is not that the drive signal of the compressor is stopped outputting directly so as to make a current of the compressor become to zero and stop the compressor freely under an action of a refrigerant pressure in a pipe. Instead, the brake current is generated by shorting the three phase windings, the brake torque for controlling the compressor is generated according to the brake current, the rotor of the compressor is controlled to be stopped according to the brake torque, and the compressor is stopped faster. Therefore, the compressor is accelerated to be still rapidly. Piping vibration and stress are efficiently reduced after the current of the compressor becomes to zero, thus a working life of the pipe in the air conditioner is prolonged.

In a first embodiment of the present disclosure, controlling the drive circuit of the compressor to short the three phase windings includes followings. The power switch tube at an upper bridge leg of each phase bridge leg is controlled to be switched off and the power switch tube at a lower bridge leg of each phase bridge leg is controlled to be switch on, such that the first node, the second node and the third node are shorted. Alternatively, the power switch tube at the upper bridge leg of each phase bridge leg is controlled to be switched on and the power switch tube at the lower bridge leg of each phase bridge leg is controlled to be switched off, such that the first node, the second node and the third node are shorted.

Figure 3:
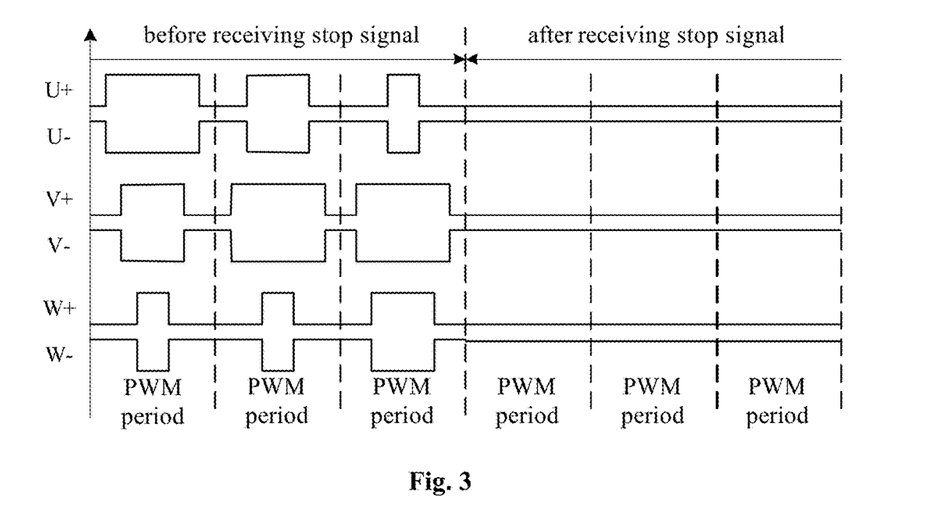
FIG. 3 is a waveform plot of a drive signal of a compressor according to a first embodiment of the present disclosure.

Specifically, as illustrated in FIG. 3, when the compressor is running, the controller outputs a SVPWM (Space Vector Pulse Width Modulation) signal for automatic closed-loop regulation (dead-time is neglected in FIG. 3) to control the six power switch tubes in the drive circuit of the compressor to switch on and off, such that the compressor runs normally. If the stop signal for stopping the compressor is received, the controller controls the power switch tube at the upper bridge leg of each phase bridge leg to switch off and controls the power switch tube at the lower bridge leg of each phase bridge leg to switch on. That is, three drive signals U+/V+/W+ are set to be low levels respectively; while three drive signals U-/V-/W- are set to be high levels respectively. Then, the three phase windings of the compressor are shorted via three power switch tubes at the lower bridge legs and diodes antiparallel therewith. Thus, the brake current is generated, and the brake torque is generated from the brake current to control the compressor to stop and stay still rapidly. Alternatively, if the stop signal for stopping the compressor is received, the controller controls the power switch tube at the upper bridge leg of each phase bridge leg to switch on and controls the power switch tube at the lower bridge leg of each phase bridge leg to switch off. That is, the three drive signals U+/V+/W+ are set to be high levels respectively; while the three drive signals U-/V-/W- are set to be low levels respectively. Then, the three phase windings of the compressor are shorted via the three power switch tubes at the upper bridge legs and the diodes antiparallel therewith. Thus, the brake current is generated, and the brake torque is generated from the brake current to control the compressor to stop and stay still rapidly.

It is to be noted that, in the embodiment of the present disclosure, the brake current of the compressor may be not detected and controlled. However, as the brake current is determined by the initial velocity of the compressor and the resistance of the rotor of the compressor, the brake current may be too large if the initial velocity of the compressor is very high and the resistance of the rotor is very low. Therefore, the embodiment is suitable for a shutdown case that the frequency of the compressor is reduced to a lower frequency.

In a second embodiment of the present disclosure, controlling the drive circuit of the compressor to short the three phase windings includes followings. The power switch tube at the upper bridge leg of each phase bridge leg is controlled to be switched off and the power switch tube at the lower bridge leg of each phase bridge leg is controlled to be simultaneously switched on or off according to a PWM (Pulse Width Modulation) signal with a first constant duty cycle, such that the brake current of the compressor is limited. Alternatively, the power switch tube at the lower bridge leg of each phase bridge leg is controlled to be switched off and the power switch tube at the upper bridge leg of each phase bridge leg is controlled to be simultaneously switched on or off according to a PWM signal with a second constant duty cycle, such that the brake current of the compressor is limited.

The first constant duty cycle and the second constant duty cycle are estimated according to the initial velocity of the compressor and the resistance of the rotor of the compressor. For example, the first constant duty cycle and the second constant duty cycle are estimated by formula (1):

$$D \leq (Ke * V_0 / R) / I_H \tag{1}$$

where, D is the first constant duty cycle or the second constant duty cycle, Ke is a back electromotive force coefficient, $V_0$ is the initial velocity, R is the resistance of the rotor, and $I_H$ is a threshold for limiting the phase current of the compressor.

Figure 4A:
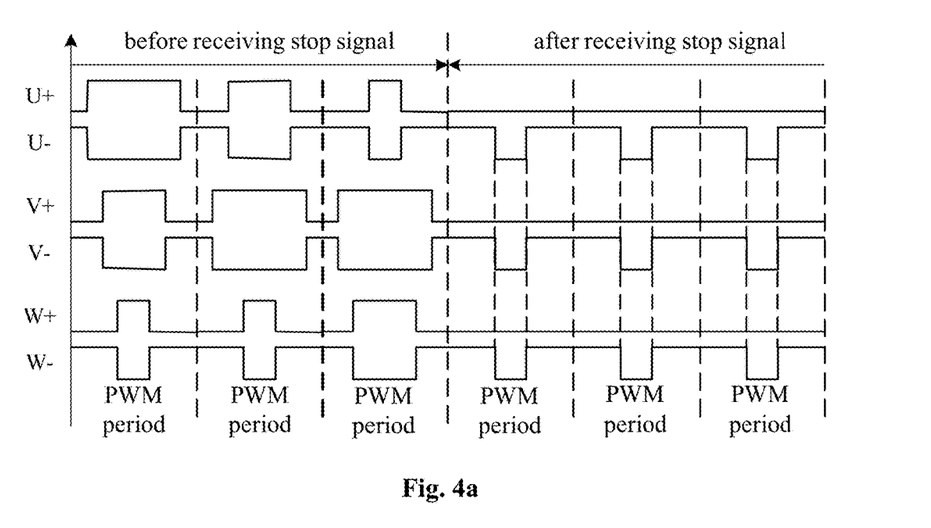
FIGS. 4a and 4b are waveform plots of drive signals of a compressor according to a second embodiment of the present disclosure.
Figure 4B:
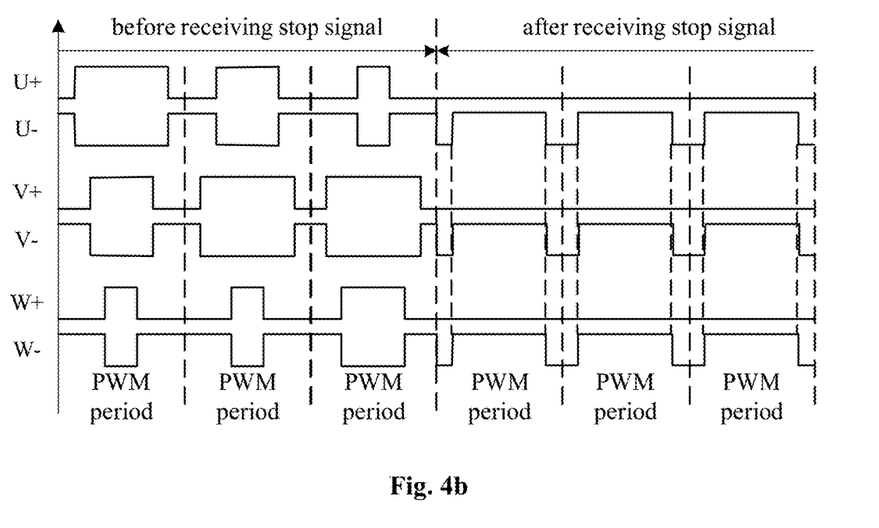

Specifically, as illustrated in FIG. 4a or FIG. 4b, when the compressor is running, the controller outputs the SVPWM signal for automatic closed-loop regulation (dead-time is neglected in FIG. 4a or FIG. 4b) to control the six power switch tubes in the drive circuit of the compressor to switch on and off, such that the compressor runs normally. If the stop signal for stopping the compressor is received, the controller controls the power switch tube at the upper bridge leg of each phase bridge leg to switch off, and controls the power switch tube at the lower bridge leg of each phase bridge leg to simultaneously switch on or off according to the PWM with the constant duty cycle, such that the brake current of the compressor is limited. That is, the three drive signals U+/V+/W+ are set to be low levels respectively; while the three drive signals U−/V−/W− are the same PWM signals with the constant duty cycles respectively. When the three power switch tubes at the lower bridge legs are simultaneously on, the three phase windings of the compressor are shorted via the three power switch tubes at the lower bridge legs and the diodes antiparallel therewith. Then, the brake current is generated, and the brake torque is generated from the brake current to control the compressor to stop and stay still rapidly. Alternatively, if the stop signal for stopping the compressor is received, the power switch tube at the lower bridge leg of each phase bridge leg is controlled to be switched off, and the power switch tubes at the upper bridge leg of each phase bridge leg is controlled to be simultaneously switched on or off according to the PWM signal with the constant duty cycle, such that the brake current of the compressor is limited. That is, the three drive signals U−/V−/W− are set to be low levels respectively; while the three drive signals U+/V+/W+ are the same PWM signals with the constant duty cycles respectively. When the three power switch tubes at the upper bridge legs are simultaneously on, the three phase windings of the compressor are shorted via the three power switch tubes at the upper bridge legs and the diodes antiparallel therewith. Then, the brake current is generated, and the brake torque is generated from the brake current to control the compressor to stop and stay still rapidly.

It is to be noted that, in the embodiment, as the brake current of the compressor is determined by the initial velocity of the compressor and the resistance of the rotor of the compressor, the brake current of the compressor may be too large if the initial velocity of the compressor is very high and the resistance of the rotor of the compressor is very low. Therefore, in the embodiment, the PWM duty cycle may be estimated according to the initial velocity of the compressor and the resistance of the rotor of the compressor, such that peak values of three phase currents do not go beyond the threshold for limiting the phase current of the compressor.

In some embodiments of the present disclosure, controlling the drive circuit of the compressor to short the three phase windings includes followings. The power switch tubes at the upper bridge leg of each phase bridge leg is controlled to be switched off, and the power switch tubes at the lower bridge leg of each phase bridge leg is controlled to be simultaneously switched on or off according to the PWM signal with a first adjustable duty cycle, such that the brake current of the compressor is limited. Alternatively, the power switch tube at the lower bridge leg of each phase bridge leg is controlled to be switched off, and the power switch tubes at the upper bridge leg of each phase bridge leg is controlled to be simultaneously switched on or off according to the PWM with a second adjustable duty cycle, such that the brake current of the compressor is limited.

As illustrated in FIGS. 5a to 5b and FIGS. 6a to 6b, the first adjustable duty cycle and the second adjustable duty cycle increase gradually. As a result, the rotor of the compressor is stopped faster to enable the compressor to stop and stay still rapidly. The first adjustable duty cycle and the second adjustable duty cycle may increase according to a time period. That is, the duty cycle increases over time. Alternatively, the first adjustable duty cycle and the second adjustable duty cycle increase as the rotation speed of the compressor decreases. That is, the duty cycle increase as the rotation speed decreases.

Specifically, as illustrated in FIGS. 5a to 5b and FIGS. 6a to 6b, when the compressor is running, the controller outputs the SVPWM signal for automatic closed-loop regulation (dead-time is neglected in FIGS. 5a to 5b and FIGS. 6a to 6b) to control the six power switch tubes in the drive circuit of the compressor to switch on and off, such that the compressor runs normally. If the stop signal for stopping the compressor is received, the controller controls the power switch tube at the upper bridge leg of each phase bridge leg to switch off, and controls the power switch tube at the lower bridge leg of each phase bridge leg to simultaneously switch on or off according to the PWM with an adjustable duty cycle, such that the brake current of the compressor is limited. That is, the three drive signals U+/V+/W+ are set to be low levels respectively; while the three drive signals U−/V−/W− are the same PWM signals with the adjustable duty cycles respectively. When the three power switch tubes at the lower bridge legs are simultaneously on, the three phase windings of the compressor are shorted via the three power switch tubes at the lower bridge legs and the diodes antiparallel therewith. Then, the brake current is generated, and the brake torque is generated from the brake current to control the compressor to stop and stay still rapidly.

Figure 5A:
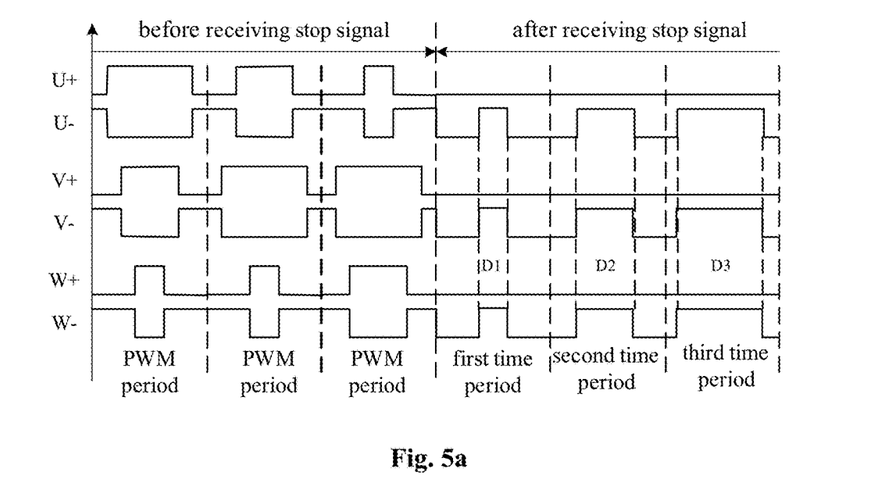
FIGS. 5a and 5b are waveform plots of drive signals of a compressor according to a third embodiment of the present disclosure.
Figure 5B:
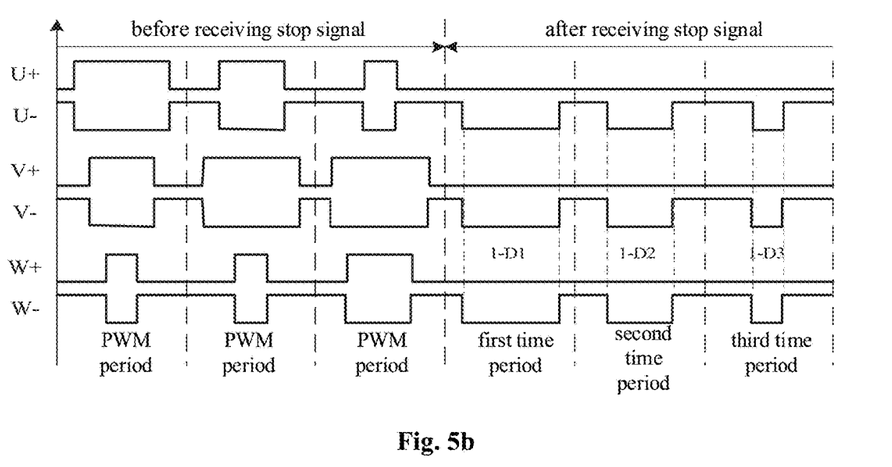
Figure 6A:
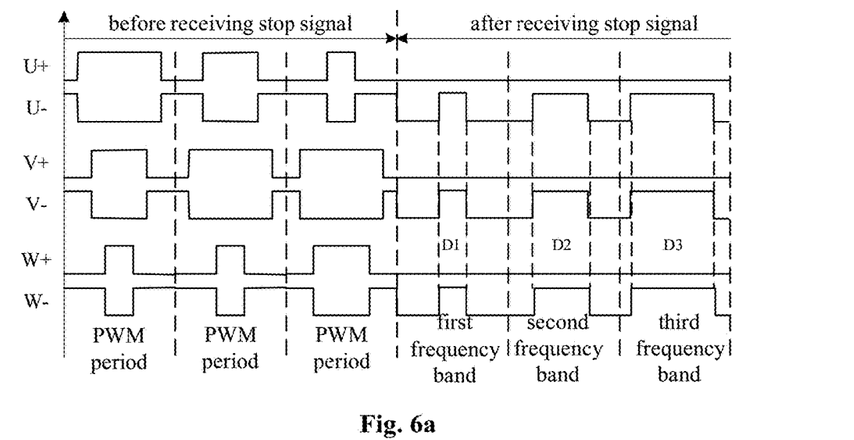
FIGS. 6a and 6b are waveform plots of drive signals of a compressor according to a fourth embodiment of the present disclosure.
Figure 6B:
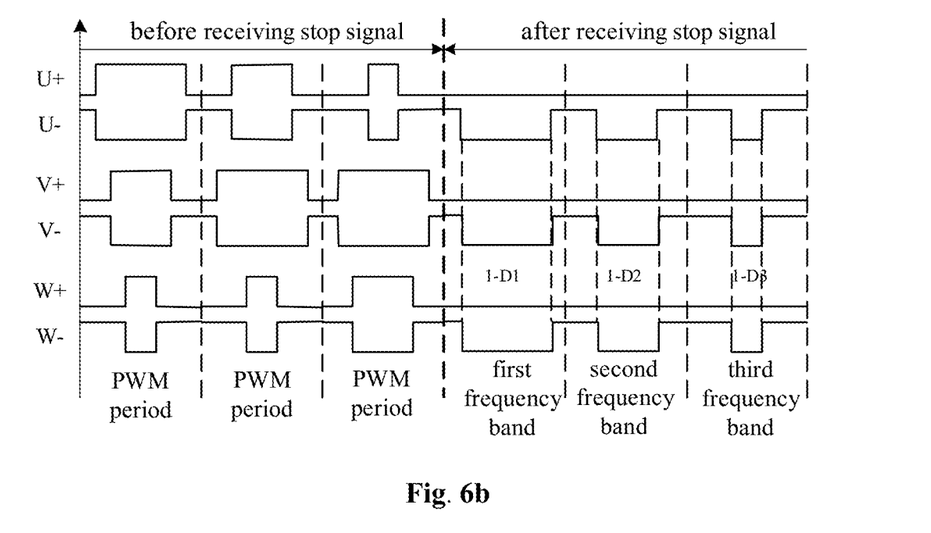

Alternatively, as illustrated in FIG. 5a or FIG. 5b, during the shutdown process that compressor is stopped, the duty cycle of the PWM signal increases according to the time period. That is, the PWM duty cycle D1 within a first time period<the PWM duty cycle D2 within a second time period<the PWM duty cycle D3 within a third time period, and the PWM duty cycle within a later time period is bigger than the PWM duty cycle within an adjacent previous time period until the compressor stays still. As illustrated in FIG. 6a or FIG. 6b, during the shutdown process that compressor is stopped, the duty cycle of the PWM signal increases as the rotation speed of the compressor decreases. That is, the PWM duty cycle D1 within a first frequency band<the PWM duty cycle D2 within a second frequency band<the PWM duty cycle D3 within a third frequency band, and the PWM duty cycle within a later frequency band is bigger than the PWM duty cycle within an adjacent previous frequency band until the compressor stays still, in which the first frequency band>the second frequency band>the third frequency band.

Alternatively, if the stop signal for stopping the compressor is received, the power switch tube at the lower bridge leg of each phase bridge leg is controlled to be switched off, and the power switch tube at the upper bridge leg of each phase bridge leg is controlled to be simultaneously switched on or off according to the PWM signal with the adjustable duty cycle, such that the brake current of the compressor is limited. That is, the three drive signals U−/V−/W− are set to be low levels respectively; while the three drive signals U+/V+/W+ are the same PWM signals with the adjustable duty cycles respectively. The duty cycle of the PWM signal may increase according to the time period or the duty cycle of the PWM signal may increase as the rotation speed of the compressor decreases, which is not elaborated herein. When the three power switch tubes at the upper bridge legs are simultaneously on, the three phase windings of the compressor are shorted via the three power switch tubes at the upper bridge legs and the diodes antiparallel therewith. Then, the brake current is generated, and the brake torque is generated from the brake current to control the compressor to stop and stay still rapidly.

It is to be noted that, in the embodiment, as the brake current of the compressor is determined by the current frequency of the compressor and the resistance of the rotor of the compressor, the brake current of the compressor may be too large if the current frequency of the compressor is very high and the resistance of the rotor of the compressor is very low. Therefore, in the embodiment, a maximum PWM duty cycle is estimated according to the current frequency of the compressor and the resistance of the rotor of the compressor, such that peak values of the three phase currents of the compressor do not go beyond the threshold for limiting the phase current of the compressor. Setting the duty cycle of the PWM signal includes setting the duty cycle within each time period or setting the duty cycle within each frequency band. The duty cycle of the PWM signal within each time period and each frequency band must not go beyond the maximum PWM duty cycle at a corresponding frequency.

Figure 7:
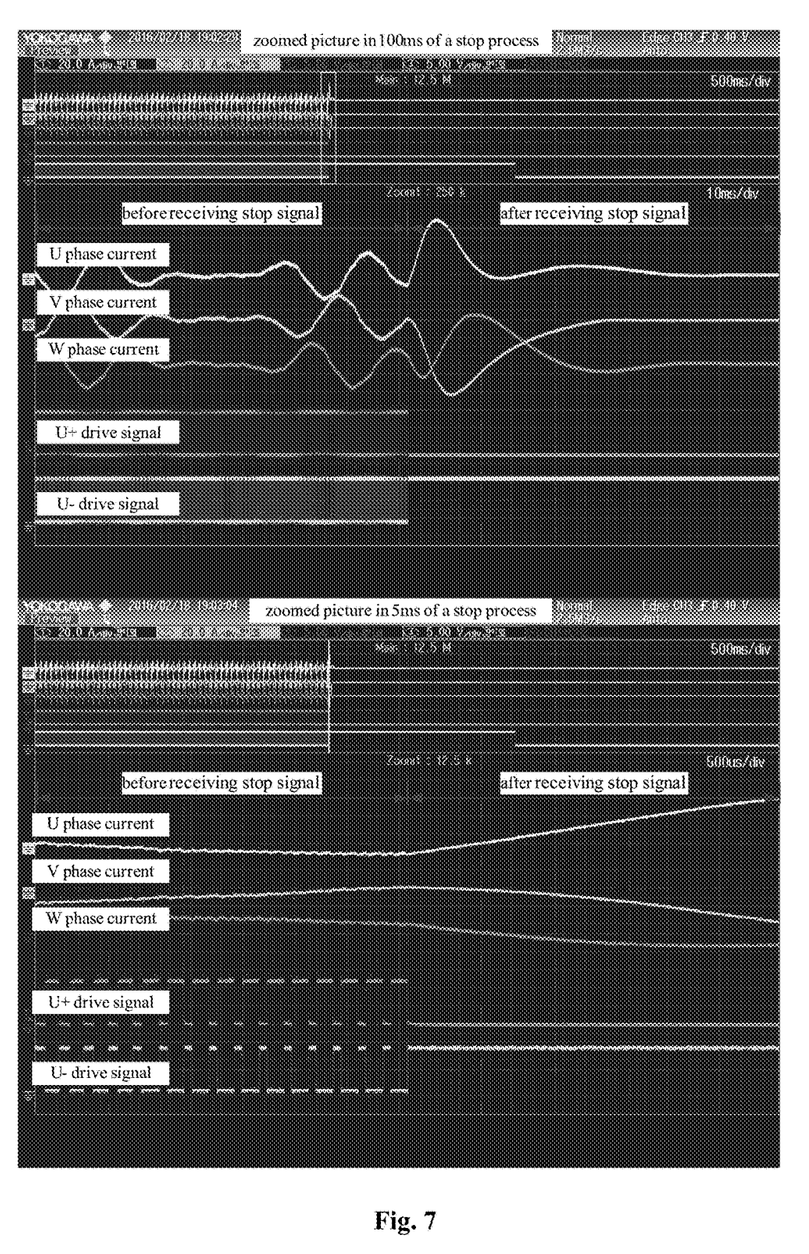
FIG. 7 is a waveform plot of a response current when a compressor is stopped according to a first embodiment of the present disclosure.
Figure 8:
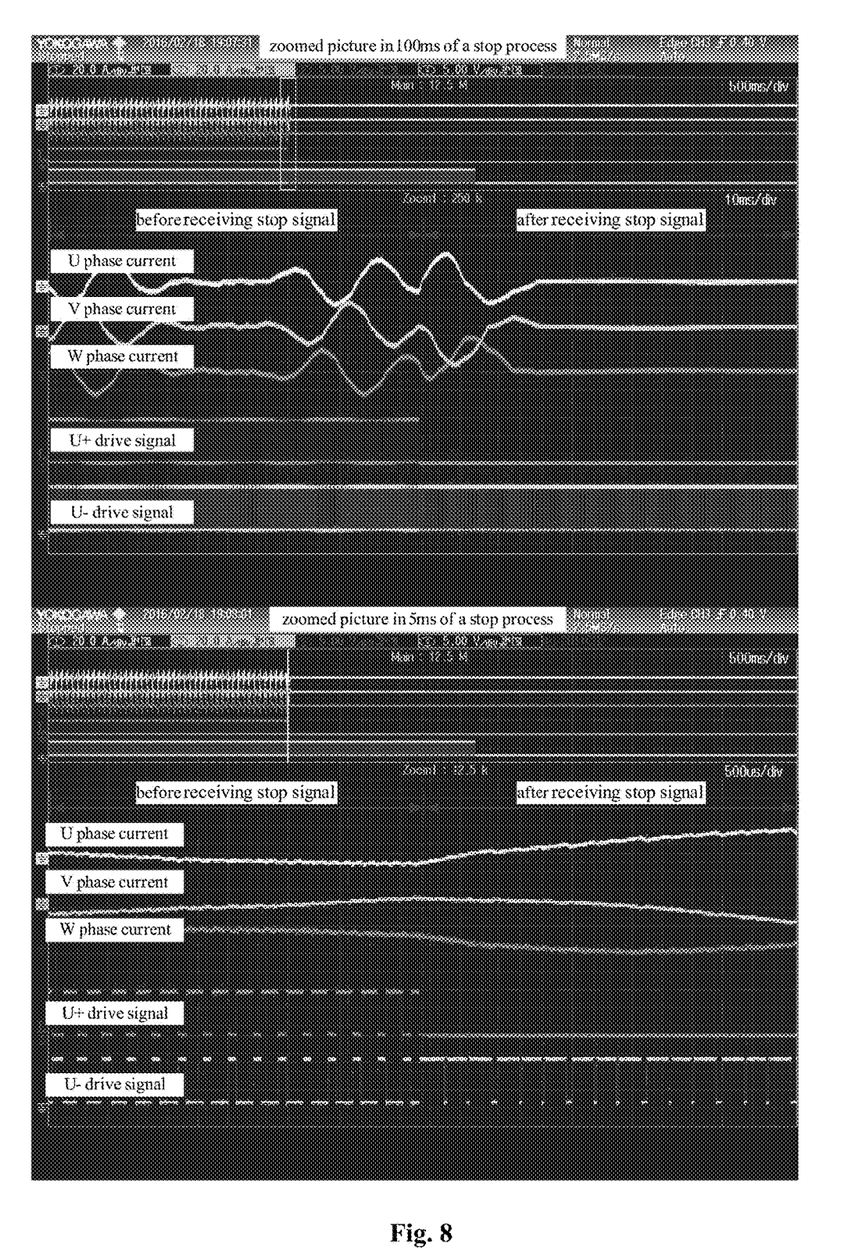
FIG. 8 is a waveform plot of a response current when a compressor is stopped according to a second embodiment of the present disclosure.

According to specific embodiments of the present disclosure, in a 3P inverter air conditioner, when the motor in the compressor is a single rotor permanent magnet synchronous motor, during the shutdown process of the air conditioner, if a running frequency of the compressor decreases to 28 Hz, the stop signal for stopping the compressor is triggered, and the controller outputs a corresponding drive signal to the drive circuit of the compressor. FIG. 7 is a waveform plot of a response current when a compressor is controlled by the drive signal illustrated in FIG. 3 to be stopped. FIG. 8 is a waveform plot of a response current when a compressor is controlled by the drive signal with the PWM duty cycle of 80% illustrated in FIG. 4a or FIG. 4b to be stopped. As illustrated in FIGS. 7 and 8, the peak value of the three phase currents is 26 A if the drive signal illustrated in FIG. 3 is used to control the compressor to stop; while the peak value of the three phase currents is 17 A if the drive signal illustrated in FIG. 4a or FIG. 4b is used to control the compressor to stop. It may be seen that, it is better to use the drive signal illustrated in FIG. 4a or FIG. 4b to limit the brake current of the compressor. Furthermore, it is required to reduce the frequency of the compressor to a low frequency if the drive signal illustrated in FIG. 3 is used to control the compressor to stop; while the compressor may be stopped at a high frequency if the drive signal illustrated in FIG. 4a or FIG. 4b is used to control the compressor to stop, while the PWM duty cycle needs to be adjusted appropriately.

With the method for controlling a compressor in an air conditioner according to embodiments of the present disclosure, during the shutdown process that the air conditioner is stopped, by controlling the drive circuit of the compressor to short the three phase windings of the compressor if the stop signal for stopping the compressor is received, and by controlling the rotor of the compressor to stop according to the brake torque generated by shorting the three phase windings, the compressor is stopped running. The method shorts the three phase windings of the compressor by controlling the drive circuit of the compressor, thus to generate the brake torque to control the rotor of the compressor to stop. As a result, the method may enable the compressor to stop and to stay still rapidly, thereby facilitating to reduce the piping stress in the air conditioner and to prolong the working life of the pipe in the air conditioner.

FIG. 2 is a diagram topology of a control circuit of a compressor in an air conditioner according to an embodiment of the present disclosure. As illustrated in FIG. 2, a device for controlling a compressor in an air conditioner includes: a drive circuit 10 and a controller 20.

The drive circuit 10 has a first output terminal, a second output terminal and a third output terminal. The three output terminals are correspondingly connected with three phase windings of the compressor respectively. The controller 20 is configured to control the drive circuit 10 of the compressor to short the three phase windings if receiving a stop signal for stopping the compressor, and to control a rotor of the compressor to stop according to a brake torque generated by shorting the three phase windings, such that the compressor is stopped running.

According to an embodiment of the present disclosure, the drive circuit 10 includes six power switch tubes. The six power switch tubes constitute three phase bridge legs. A first bridge leg of the three phase bridge legs has a first node J1, a second bridge leg of the three phase bridge legs has a second node J2, and a third bridge leg of the three phase bridge legs has a third node J3. The first node J1 is the first output terminal of the drive circuit 10, the second node J2 is the second output terminal of the drive circuit 10, and the third node J3 is the third output terminal of the drive circuit 10. The six power switch tubes may be ICBTs or MOSFETs. Each power switch tube is antiparallel with a diode. It may be understood that, in embodiments of the present disclosure, an IPM may be directly employed as the drive circuit 10 of the compressor.

As illustrated in FIG. 2, when the compressor is running, the controller 20 outputs a drive signal of the compressor to the drive circuit 10 of the compressor, to control six switch tubes in the drive circuit to switch on and off, thus the compressor is controlled. If the stop signal for stopping the compressor is received, the controller 20 shorts the three phase windings of the compressor by controlling the drive circuit 10 of the compressor. And then, a brake torque is generated to control the compressor to stop and to stay still rapidly.

In embodiments of the present disclosure, a motor in the compressor may be a permanent magnet synchronous motor or a permanent magnet brushless DC motor. Due to an action of a permanent magnet in the permanent magnet synchronous motor or in the permanent magnet brushless DC motor, a back electromotive force is generated as the rotor rotates if the three phase windings are shorted. A phase current (a brake current) is generated from the back electromotive force under actions of a resistance and an inductance of the rotor. And a counter brake torque is generated from the phase current to control the rotor of the compressor to stop. Therefore, the brake torque is generated by shoring the three phase windings if a rotation speed of the rotor reaches a certain initial velocity. Then, the rotor is stopped faster, thus enabling the compressor to stop and stay still rapidly.

In other words, in embodiments of the present disclosure, after the stop signal for stopping the compressor is received, it is not that the drive signal of the compressor is stopped outputting directly so as to make a current of the compressor become to be zero and stop the compressor freely under an action of a refrigerant pressure in a pipe. Instead, the brake current is generated by shorting the three phase windings, the brake torque for controlling the compressor is generated according to the brake current, the rotor of the compressor is controlled to be stopped according to the brake torque, and the compressor is stopped faster. Therefore, the compressor is accelerated to be still rapidly. Piping vibration and stress are efficiently reduced after the current of the compressor becomes to be zero, thus a working life of the pipe in the air conditioner is prolonged.

In a first embodiment of the present disclosure, the controller 20 controls the power switch tube at an upper bridge leg of each phase bridge leg to switch off and controls the power switch tube at a lower bridge leg of each phase bridge leg to switch on, such that the first node J1, the second node J2 and the third node J3 are shorted. Alternatively, the controller 20 controls the power switch tube at the upper bridge leg of each phase bridge leg to switch on, and controls the power switch tube at the lower bridge leg of each phase bridge leg to switch off, such that the first node J1, the second node J2 and the third node J3 are shorted.

Specifically, as illustrated in FIG. 3, when the compressor is running, the controller 20 outputs a SVPWM signal for automatic closed-loop regulation (dead-time is neglected in FIG. 3) to control the six power switch tubes in the drive circuit 10 of the compressor to switch on and off, such that the compressor runs normally. If the stop signal for stopping the compressor is received, the controller 20 controls the power switch tube at the upper bridge leg of each phase bridge leg to switch off and controls the power switch tube at the lower bridge leg of each phase bridge leg to switch on. That is, three drive signals U+/V+/W+ are set to be low levels respectively; while three drive signals U−/V−/W− are set to be high levels respectively. Then, the three phase windings of the compressor are shorted via three power switch tubes at the lower bridge legs and diodes antiparallel therewith. Thus, the brake current is generated, and the brake torque is generated from the brake current to control the compressor to stop and stay still rapidly. Alternatively, if the stop signal for stopping the compressor is received, the controller 20 controls the power switch tube at the upper bridge leg of each phase bridge leg to switch on and controls the power switch tube at the lower bridge leg of each phase bridge leg to switch off. That is, the three drive signals U+/V+/W+ are set to be high levels respectively; while the three drive signals U−/V−/W− are set to be low levels respectively. Then, the three phase windings of the compressor are shorted via the three power switch tubes at the upper bridge legs and the diodes antiparallel therewith. Thus, the brake current is generated, and the brake torque is generated from the brake current to control the compressor to stop and stay still rapidly.

It is to be noted that, in the embodiment of the present disclosure, the brake current of the compressor may be not detected and controlled. However, as the brake current is determined by the initial velocity of the compressor and the resistance of the rotor of the compressor, the brake current may be too large if the initial velocity of the compressor is very high and the resistance of the rotor is very low. Therefore, the embodiment is suitable for a shutdown case that the frequency of the compressor is reduced to a lower frequency.

In a second embodiment of the present disclosure, the controllers 20 controls the power switch tube at the upper bridge leg of each phase bridge leg to switch off, and controls the power switch tube at the lower bridge leg of each phase bridge leg to simultaneously switch on or off according to a PWM signal with a first constant duty cycle, such that the brake current of the compressor is limited. Alternatively, the controller 20 controls the power switch tube at the lower bridge leg of each phase bridge leg to switch off, and controls the power switch tube at the upper bridge leg of each phase bridge leg to simultaneously switch on or off according to a PWM signal with a second constant duty cycle, such that the brake current of the compressor is limited. The first constant duty cycle and the second constant duty cycle are estimated according to the initial velocity of the compressor and the resistance of the rotor of the compressor. For example, the first constant duty cycle and the second constant duty cycle are estimated by formula (1).

Specifically, as illustrated in FIG. 4*a* or FIG. 4*b*, when the compressor is running, the controller 20 outputs the SVPWM signal for automatic closed-loop regulation (dead-time is neglected in FIG. 4*a* or FIG. 4*b*) to control the six power switch tubes in the drive circuit 10 of the compressor to switch on and off, such that the compressor runs normally. If the stop signal for stopping the compressor is received, the controller 20 controls the power switch tube at the upper bridge leg of each phase bridge leg to switch off, and controls the power switch tube at the lower bridge leg of each phase bridge leg to simultaneously switch on or off according to the PWM with the constant duty cycle, such that the brake current of the compressor is limited. That is, the three drive signals U+/V+/W+ are set to be low levels respectively; while the three drive signals U−/V−/W− are the same PWM signals with the constant duty cycles respectively. When the three power switch tubes at the lower bridge legs are simultaneously on, the three phase windings of the compressor are shorted via the three power switch tubes at the lower bridge legs and the diodes antiparallel therewith. Then, the brake current is generated, and the brake torque is generated from the brake current to control the compressor to stop and stay still rapidly. Alternatively, if the stop signal for stopping the compressor is received, the controller 20 controls the power switch tube at the lower bridge leg of each phase bridge leg to switch off, and controls the power switch tubes at the upper bridge leg of each phase bridge leg to simultaneously switch on or off according to the PWM signal with the constant duty cycle, such that the brake current of the compressor is limited. That is, the three drive signals U−/V−/W− are set to be low levels respectively; while and the three drive signals U+/V+/W+ are the same PWM signals with the constant duty cycles respectively. When the three power switch tubes at the upper bridge legs are simultaneously on, the three phase windings of the compressor are shorted via the three power switch tubes at the upper bridge legs and the diodes antiparallel therewith. Then, the brake current is generated, and the brake torque is generated from the brake current to control the compressor to stop and stay still rapidly.

It is to be noted that, in the embodiment, as the brake current of the compressor is determined by the initial velocity of the compressor and the resistance of the rotor of the compressor, the brake current of the compressor may be too large if the initial velocity of the compressor is very high and the resistance of the rotor of the compressor is very low. Therefore, in the embodiment, the PWM duty cycle may be estimated according to the initial velocity of the compressor and the resistance of the rotor of the compressor, such that peak values of three phase currents do not go beyond the threshold for limiting the phase current of the compressor.

In some embodiments of the present disclosure, the controller 20 controls the power switch tubes at the upper bridge leg of each phase bridge leg to switch off, and controls the power switch tubes at the lower bridge leg of each phase bridge leg to simultaneously switch on or off according to the PWM signal with a first adjustable duty cycle, such that the brake current of the compressor is limited. Alternatively, the controller 20 controls the power switch tube at the lower bridge leg of each phase bridge leg to switch off, and controls the power switch tubes at the upper bridge leg of each phase bridge leg to simultaneously switch on or off according to the PWM with a second adjustable duty cycle, such that the brake current of the compressor is limited.

As illustrated in FIGS. 5a to 5b and FIGS. 6a to 6b, the first adjustable duty cycle and the second adjustable duty cycle increase gradually. As a result, the rotor of the compressor is stopped faster to enable the compressor to stop and stay still rapidly. The first adjustable duty cycle and the second adjustable duty cycle may increase according to a time period. That is, the duty cycle increases over time. Alternatively, the first adjustable duty cycle and the second adjustable duty cycle increase as the rotation speed of the compressor decreases. That is, the duty cycle increase as the rotation speed decreases.

Specifically, as illustrated in in FIGS. 5a to 5b and FIGS. 6a to 6b, when the compressor is running, the controller 20 outputs the SVPWM signal for automatic closed-loop regulation (dead-time is neglected in FIGS. 5a to 5b and FIGS. 6a to 6b) to control the six power switch tubes in the drive circuit 10 of the compressor to switch on and off, such that the compressor runs normally. If the stop signal for stopping the compressor is received, the controller 20 controls the power switch tube at the upper bridge leg of each phase bridge leg to switch off, and controls the power switch tube at the lower bridge leg of each phase bridge leg to simultaneously switch on or off according to the PWM with an adjustable duty cycle, such that the brake current of the compressor is limited. That is, the three drive signals U+/V+/W+ are set to be low levels respectively; while the three drive signals U−/V−/W− are the same PWM signals with the adjustable duty cycles respectively. When the three power switch tubes at the lower bridge legs are simultaneously on, the three phase windings of the compressor are shorted via the three power switch tubes at the lower bridge legs and the diodes antiparallel therewith. Then, the brake current is generated, and the brake torque is generated from the brake current to control the compressor to stop and stay still rapidly.

Alternatively, as illustrated in FIG. 5a or FIG. 5b, during the shutdown process that compressor is stopped, the duty cycle of the PWM signal increases according to the time period. That is, the PWM duty cycle D1 within a first time period<the PWM duty cycle D2 within a second time period<the PWM duty cycle D3 within a third time period, and the PWM duty cycle within a later time period is bigger than the PWM duty cycle within an adjacent previous time period until the compressor stays still. As illustrated in FIG. 6a or FIG. 6b, during the shutdown process that compressor is stopped, the duty cycle of the PWM signal increases as the rotation speed of the compressor decreases. That is, the PWM duty cycle D1 within a first frequency band<the PWM duty cycle D2 within a second frequency band<the PWM duty cycle D3 within a third frequency band, and the PWM duty cycle within a later frequency band is bigger than the PWM duty cycle within an adjacent previous frequency band until the compressor stays still, in which the first frequency band>the second frequency band>the third frequency band.

Alternatively, if the stop signal for stopping the compressor is received, the controller 20 controls the power switch tube at the lower bridge leg of each phase bridge leg to switch off, and controls the power switch tube at the upper bridge leg of each phase bridge leg to simultaneously switch on or off according to the PWM signal with the adjustable duty cycle, such that the brake current of the compressor is limited. That is, the three drive signals U−/V−/W− are set to be low levels respectively; while the three drive signals U+/V+/W+ are the same PWM signals with the adjustable duty cycles respectively. The duty cycle of the PWM signal may increase according to the time period or the duty cycle of the PWM signal may increase as the rotation speed of the compressor decreases, which is not elaborated herein. When the three power switch tubes at the upper bridge legs are simultaneously on, the three phase windings of the compressor are shorted via the three power switch tubes at the upper bridge legs and the diodes antiparallel therewith. Then, the brake current is generated, and the brake torque is generated from the brake current to control the compressor to stop and stay still rapidly.

It is to be noted that, in the embodiment, as the brake current of the compressor is determined by the current frequency of the compressor and the resistance of the rotor of the compressor, the brake current of the compressor may be too large if the current frequency of the compressor is very high and the resistance of the rotor of the compressor is very low. Therefore, in the embodiment, a maximum PWM duty cycle is estimated according to the current frequency of the compressor and the resistance of the rotor of the compressor, such that peak values of the three phase currents of the compressor do not go beyond the threshold for limiting the phase current of the compressor. Setting the duty cycle of the PWM signal includes setting the duty cycle within each time period or setting the duty cycle within each frequency band. The duty cycle of the PWM signal within each time period and each frequency band must not go beyond the maximum PWM duty cycle at a corresponding frequency.

According to specific embodiments of the present disclosure, in a 3P inverter air conditioner, when the motor in the compressor is a single rotor permanent magnet synchronous motor, during the shutdown process of the air conditioner, if a running frequency of the compressor decreases to 28 Hz, the stop signal for stopping the compressor is triggered, and the controller 20 outputs a corresponding drive signal to the drive circuit 10 of the compressor. FIG. 7 is a waveform diagram of a response current when a compressor is controlled by the drive signal illustrated in FIG. 3 to be stopped. FIG. 8 is a waveform diagram of a response current when a compressor is controlled by the drive signal with the PWM duty cycle of 80% illustrated in FIG. 4a or FIG. 4b to be stopped. As illustrated in FIGS. 7 and 8, the peak value of the three phase currents is 26 A if the drive signal illustrated in FIG. 3 is used to control the compressor to stop; while the peak value of the three phase currents is 17 A if the drive signal illustrated in FIG. 4a or FIG. 4b is used to control the compressor to stop. It may be seen that, it is better to use the drive signal illustrated in FIG. 4a or FIG. 4b to limit the brake current of the compressor. Furthermore, it is required to reduce the frequency of the compressor to a low frequency if the drive signal illustrated in FIG. 3 is used to control the compressor to stop; while the compressor may be stopped at a high frequency if the drive signal illustrated in FIG. 4a or FIG. 4b is used to control the compressor to stop, while the PWM duty cycle needs to be adjusted appropriately.

With the device for controlling a compressor in an air conditioner according to embodiments of the present disclosure, the controller shorts the three phase windings of the compressor by controlling the drive circuit of the compressor if the controller receives the stop signal for stopping the compressor. And then, the controller controls the rotor of the compressor to stop according to the brake torque generated by shoring the three phase windings of the compressor, such that the compressor is stopped running. The device shorts the three phase windings of the compressor by controlling the drive circuit of the compressor, thus to generate the brake torque to control the rotor of the compressor to stop. As a result, the device may enable the compressor to stop and to stay still rapidly, thereby facilitating to reduce the piping stress in the air conditioner and to prolong a working life of the pipe in the air conditioner.

In addition, embodiments of the present disclosure further disclose an air conditioner. The air conditioner includes the device for controlling a compressor in an air conditioner to stop.

With the air conditioner according to embodiments of the present disclosure, via the device described above, during the shutdown process of the air conditioner, by controlling the drive circuit of the compressor to short the three phase windings of the compressor to generate the brake torque if the stop signal for stopping the compressor is received, the rotor of the compressor is stopped faster. As a result, the compressor may be stopped and stay still rapidly, thereby facilitating to reduce the piping stress in the air conditioner and to prolong a working life of the pipe in the air conditioner.

In the description of the present disclosure, it is to be understood that, terms such as "first" and "second" are used herein for purposes of description, are not intended to indicate or imply relative importance or significance or to indicate or imply the number of technical features. Furthermore, the feature defined with "first" and "second" may comprise one or more this feature distinctly or implicitly. In the description of the present disclosure, "a plurality of" means two or more than two, unless specified otherwise.

In the present disclosure, unless specified or limited otherwise, the terms "mounted," "connected," "coupled" and "fixed" are understood broadly, such as fixed, detachable mountings, connections and couplings or integrated, and can be mechanical or electrical mountings, connections and couplings, and also can be direct and via media indirect mountings, connections, and couplings, and further can be inner mountings, connections and couplings of two components or interaction relations between two components, which can be understood by those skilled in the art according to the detail embodiment of the present disclosure.

In the present disclosure, unless specified or limited otherwise, the first characteristic is "on" or "under" the second characteristic refers to the first characteristic and the second characteristic can be direct or via media indirect mountings, connections, and couplings. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature is at a height higher than that of the second feature. While a first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature is at a height lower than that of the second feature.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art.

Although explanatory embodiments have been illustrated and described, it would be appreciated by those skilled in the art that the above embodiments cannot be construed to limit the present disclosure, and changes, alternatives, and modifications can be made in the embodiments without departing from scope of the present disclosure

What is claimed is:

1. A method for controlling a compressor in an air conditioner to stop, comprising:
   during a shutdown process of the air conditioner, controlling a drive circuit of the compressor to short three phase windings of the compressor upon receiving a stop signal for stopping the compressor, the drive circuit including six power switches forming three phase bridge legs each having a node connected with one of the three phase windings, and controlling the drive circuit including:
      controlling the power switch at one of an upper bridge leg and a lower bridge leg of each of the three phase bridge legs to switch off; and
      controlling the power switch at the other one of the upper bridge leg and the lower bridge leg of the each of the three phase bridge legs to switch on or to switch on or off according to a pulse width modulation (PWM) signal; and
   controlling a rotor of the compressor to stop according to a brake torque generated by shorting the three phase windings, to stop the compressor.

2. The method according to claim 1, wherein each of the six power switch is antiparallel with a diode.

3. The method according to claim 1, wherein the PWM signal has a constant duty cycle.

4. The method according to claim 3, wherein the constant duty cycle is estimated according to an initial velocity of the compressor and a resistance of the rotor of the compressor.

5. The method according to claim 1, wherein the PWM signal has an adjustable duty cycle.

6. The method according to claim 5, wherein the adjustable duty cycle increases gradually.

7. The method according to claim 5, wherein the adjustable duty cycle increases according to a time period, or as a rotation speed of the compressor decreases.

8. The method according to claim 5, wherein the adjustable duty cycle is estimated according to a current frequency of the compressor and a resistance of the rotor of the compressor.

9. A device for controlling a compressor in an air conditioner to stop, comprising:
   a drive circuit including six power switches forming three phase bridge legs each having a node connected with one of three phase windings of the compressor; and
   a controller configured to:

control the drive circuit to short the three phase windings upon receiving a stop signal for stopping the compressor by:
  controlling the power switch at one of an upper bridge leg and a lower bridge leg of each of the three phase bridge legs to switch off; and
  controlling the power switch at the other one of the upper bridge leg and the lower bridge leg of the each of the three phase bridge legs to switch on or to switch on or off according to a pulse width modulation (PWM) signal; and
control a rotor of the compressor to stop according to a brake torque generated by shorting the three phase windings, to stop the compressor.

10. The device according to claim 9, wherein each of the six power switch is antiparallel with a diode.

11. The device according to claim 9, wherein the PWM signal has a constant duty cycle.

12. The device according to claim 11, wherein the constant duty cycle is estimated according to an initial velocity of the compressor and a resistance of the rotor of the compressor.

13. The device according to claim 9, wherein the PWM signal has an adjustable duty cycle.

14. The device according to claim 13, wherein the adjustable duty cycle increases gradually.

15. The device according to claim 13, wherein the adjustable duty cycle increases according to a time period, or as a rotation speed of the compressor decrease.

16. The device according to claim 13, wherein the adjustable duty cycle is estimated according to a current frequency of the compressor and a resistance of the rotor of the compressor.

17. The device according to claim 9, wherein a motor of the compressor is a permanent magnet synchronous motor or a permanent magnet brushless DC motor.

18. An air conditioner, comprising a device for controlling the compressor in the air conditioner to stop, wherein the device comprises:
  a drive circuit, including six power switches forming three phase bridge legs each having a node connected with one of three phase windings of the compressor; and
  a controller configured to:
    control the drive circuit to short the three phase windings upon receiving a stop signal for stopping the compressor by:
      controlling the power switch at one of an upper bridge leg and a lower bridge leg of each of the three phase bridge legs to switch off; and
      controlling the power switch at the other one of the upper bridge leg and the lower bridge leg of the each of the three phase bridge legs to switch on or to switch on or off according to a pulse width modulation (PWM) signal; and
    control a rotor of the compressor to stop according to a brake torque generated by shorting the three phase windings, to stop the compressor.

* * * * *